(12) United States Patent
Albalat Perez et al.

(10) Patent No.: US 7,214,737 B2
(45) Date of Patent: May 8, 2007

(54) HIGH-WASHABILITY AQUEOUS POLYMER DISPERSION, PREPARATION AND USE THEREOF AS BINDER IN COATING COMPOSITIONS

(75) Inventors: Jordi Albalat Perez, Barcelona (ES); Carme Font Panades, Sant Quirze del Valles (ES); Werner Ullenboom, Rheinberg (DE)

(73) Assignee: Cray Valley Kunstharze GmbH, Tonisvorst (DE)

( * ) Notice: Subject to any disclaimer, the term of this patent is extended or adjusted under 35 U.S.C. 154(b) by 43 days.

(21) Appl. No.: 10/488,817

(22) PCT Filed: Sep. 6, 2002

(86) PCT No.: PCT/EP02/10188

§ 371 (c)(1),
(2), (4) Date: Mar. 5, 2004

(87) PCT Pub. No.: WO03/025032

PCT Pub. Date: Mar. 27, 2003

(65) Prior Publication Data

US 2004/0249064 A1 Dec. 9, 2004

(30) Foreign Application Priority Data

Sep. 14, 2001 (EP) .................................. 01000467

(51) Int. Cl.
*C08F 2/16* (2006.01)
(52) U.S. Cl. ........................ 524/804; 524/832; 524/833

(58) Field of Classification Search ................ 524/804, 524/832, 833
See application file for complete search history.

(56) References Cited

U.S. PATENT DOCUMENTS 4,144,212 A * 3/1979 Linder et al. ................ 524/818

FOREIGN PATENT DOCUMENTS

WO    WO 94/21699    *   9/1994

* cited by examiner

*Primary Examiner*—Edward J. Cain
(74) *Attorney, Agent, or Firm*—Whyte Hirschboeck Dudek SC

(57) ABSTRACT

The invention concerns an aqueous polymer dispersion, prepared from a monomer composition comprising: (A) 50 to 99.99 parts by weight of at least an acrylic or methacrylic ester derived from acrylic or methacrylic acid and an alcohol having 1 to 12 carbon atoms; (B) 0 to 40 parts by weight of at least a vinylaromatic monomer; (C) 0 to 5 parts by weight of at least a short-chain $\alpha,\beta$-unsaturated mono- or polycarboxylic acid; (D) 0.01 to 5 parts by weight of at least an ethylenically unsaturated alpha-beta monomer compound (D), comprising at least a carbonyl group having at least a hydrogen atom borne in position alpha of said carbonyl (diacetone acrylamide), for 100 parts by weight of monomers (A)+(B)+(C)+(D), 80 to 98 wt. % of monomer components having been added to a reaction medium already containing a totally or partly polymerized pre-emulsion representing 2 to 20 wt. % of the final global proportion of monomer components in the dispersion finally obtained.

29 Claims, No Drawings

HIGH-WASHABILITY AQUEOUS POLYMER DISPERSION, PREPARATION AND USE THEREOF AS BINDER IN COATING COMPOSITIONS

The present invention relates to an aqueous polymer dispersion (latex) of pure acrylic or acrylic-styrene type which has a high binding power with respect to fillers; to a specific process allowing the preparation of this aqueous polymer dispersion; and to the application of the latter as binder in coating compositions, in particular in paint formulations, especially in solvent-free paint formulations (or coalescent), having an excellent washability despite a low level of binder, concerning more particularly protective and/or decorative paints for external and/or internal use on substrates such as wall faces, wood, metals or plastics.

When an aqueous polymer dispersion is applied to a substrate and after the water has evaporated, a film appears at the surface of said substrate due to the coalescence of the polymer present in the emulsion. This film formation has to be good in order to produce a homogeneous film. For good film formation, the polymer particles have to possess a viscoelastic nature. In fact, the coalescence forces must exceed the resistance of the particles to deformation (plastic flow). For this reason, the following are conventionally used to modify the viscoelastic nature of the polymer:

plasticizers, which increase the elongation and elasticity; and solvents (also known as coalescents), which are "fugitive" plasticizers, because they facilitate the elastic deformation of the particles of the latex.

However, plasticizers have disadvantages: that of reducing the breaking strength of the resin in which they are incorporated and that of exhibiting a characteristic odor.

Solvents exhibit the disadvantages of being volatile, dangerous to handle and/or toxic and their use is not favorable to protecting the environment.

Furthermore, one applicative characteristic of the good film formation of a coating is the washability, which is the ability to withstand cracking and peeling in an aqueous environment, such as ordinary conditions of use. Standard methods for measuring this washability exist which are known to a person skilled in the art.

According to the prior state of the art, attempts have already been made to improve the washability of latexes of purely acrylic type or of styrene-acrylic type by including small amounts of an additional functional monomer in the structure of the polymer.

Various monomers of this type have been provided, for example monomers such as $C_5$ to $C_{36}$ carboxylic acids and their ammonium salts, amides, esters, aldehydes and alcohols (patent application EP-A-252 526), acetoacetic acid esters (patent application DE-A-2 535 372), ethylene urea derivatives (patent U.S. Pat. No. 4,500,673), reaction products of 2-aminoethylethylene urea and of alkyl glycidyl ether (patent U.S. Pat. No. 4,426,503), reaction products of aminoalkylalkylene urea, of saturated monoepoxides and of methacrylate-functionalized monoisocyanate (U.S. Pat. No. 4,526,915), imidazolidinone derivatives (international application WO-A-91/12 243), N-(2,2-dimethoxyethyl)methacrylamide (patent application EP-A-337 873) or glycidyl ethers (patent application EP-A-69 326).

However, this solution is not satisfactory or appropriate for various reasons: these monomers are expensive, they are toxic and/or dangerous and they do not introduce the performances required for certain applications, which are to achieve high washability values for levels of binder which are as low as possible, in the absence of coalescent.

The prior European application EP-A-0 690 882 of the Applicant Company, which represents the state of the art closest to the invention, discloses that an improvement in the washability of latex-based paints of the purely acrylic or acrylic-styrene type can be obtained with a novel latex prepared by a very specific route, without having recourse to plasticizers, to coalescents and to the specific monomers mentioned above.

The latex in question (EP-A-0 690 882) is prepared from a monomer composition comprising:

60–100 parts by weight of at least one $C_{1-12}$ alkyl (meth)acrylate;

0–40 parts by weight of at least one vinylaromatic monomer;

0–5 parts by weight of at least one short-chain $\alpha,\beta$-unsaturated mono- or polycarboxylic acid; and 0–3 parts by weight of at least one short-chain $\alpha,\beta$-unsaturated amide, and is obtained by a process comprising the following two essential stages:

(1) in a first stage, 2 to 20% by weight of the monomer composition are introduced into a reactor and a partial emulsion prepolymerization is carried out in order to obtain a pre-emulsion having a mean size of polymer particles not exceeding 95 nm (this particle size is thus controlled); and (2) in a second stage, a complete emulsion polymerization of the remaining monomer composition, which is added to said partially polymerized pre-emulsion, is carried out.

A postheating treatment is also disclosed in this document, advantageously making it possible to achieve a residual level of monomer not exceeding 50 ppm.

Such emulsions result in an improvement in the washability but the level of washability and more particularly the ratio of washability to the level of binder involved in the coating composition still remained inadequate for more specific applications targeted by the present invention which are mentioned above. The absence of coalescent added to the targeted coating compositions already renders the film formation of the latex composition more difficult and, furthermore, for some applications, the stability on storage of these compositions before use remains to be improved, while retaining a high washability for a low targeted binder level, which generally does not exceed 10% by weight, expressed with regard to the latex on a dry basis. The absence of stability on storage is displayed essentially by an increase in the viscosity of the latex with storage time as a result of the increasing flocculation of the latex particles.

There also exists a need for paint formulations which, with at least equivalent performances, require a lower level of binder.

In seeking to solve this problem and to eliminate the associated disadvantages, the Applicant Company has discovered that the introduction of 0.01 to 5% by weight, with respect to the final overall level of monomers, of at least one $\alpha,\beta$-ethylenically unsaturated compound comprising at least one carbonyl group having at least one hydrogen atom carried by a carbon atom in the $\alpha$ position with respect to said carbonyl makes it possible not only to solve the problem posed but also, surprisingly, to further improve the washability by a significant factor of at least 2 (according to the DIN 53778 standard).

A first subject matter of the present invention is therefore an aqueous polymer dispersion, a second subject matter of the present invention is therefore a specific process for the preparation of this dispersion and a third subject matter of the present invention is therefore a protective and/or decorative coating composition comprising this dispersion as binder for specific applications.

The first subject matter therefore relates to an aqueous polymer dispersion prepared from a monomer composition comprising:
(A) 50 to 99.99 parts by weight of at least one acrylic or methacrylic ester derived from acrylic or methacrylic acid and from an alcohol having 1 to 12 carbon atoms;
(B) 0 to 40 parts by weight of at least one vinylaromatic monomer;
(C) 0 to 5 parts by weight of at least one short-chain α,β-unsaturated mono- or polycarboxylic acid; and
(D) 0.01 to 5 parts by weight of at least one α,β-ethylenically unsaturated monomer compound (D) comprising at least one carbonyl group having at least one hydrogen atom carried by a carbon atom in the α position with respect to said carbonyl, per 100 parts by weight of the monomers (A)+(B)+(C)+(D), with 80 to 98% by weight of the monomer components having been added to a reaction medium already comprising a partially or completely polymerized pre-emulsion representing from 2 to 20% by weight of the final overall level of the monomer components in the dispersion finally obtained.

The prepolymerization is a complete prepolymerization or, preferably, a partial prepolymerization, in which case it is carried out to a conversion of at least 50%, preferably at least 90% and up to less than 100% conversion, and in particular to a conversion of at least 50% and preferably at least 90% conversion, and up to a conversion of 98%.

In particular, the aqueous dispersion does not comprise any functional group or component capable of reacting with the units resulting from said compound or compounds (D) in a self-crosslinking reaction.

Mention may be made, among the compounds (D), as example, of the following: diacetone acrylamide (DAAM), diacetone methacrylamide, 2-butanone (meth)acrylate, vinyl acetoacetate or acetoacetoxyethyl (meth)acrylate. Mention may be made, among the most preferred compounds (D), of diacetone acrylamide (DAAM) and diacetone methacrylamide according to the general formula (I):

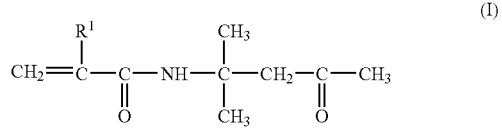

with $R^1$: H or methyl.

The presence of such compounds and in particular of diacetone acrylamide in aqueous polymer dispersions is already disclosed in the prior state of the art but its role of crosslinking agent requires the compulsory additional presence in this dispersion of a second agent which reacts with the units resulting (by polymerization) from the unsaturated carbonyl-comprising compounds, the co-crosslinking taking place during the film formation/formation of the final coating phase (self-crosslinking of the dispersion on drying). Such a crosslinking is known to improve the mechanical strength of the film. Such common uses of diacetone acrylamide are disclosed, for example, in EP-A-1 029 006. The commonest co-crosslinking agents with compounds of diacetone acrylamide type are hydrazide derivatives (with carboxylic acids). The aqueous polymer or coating compositions which result therefrom and which are known in the prior state of the art necessarily involve the compulsory presence with the derivatives of type (D) of co-crosslinking agents of the hydrazide derivatives, amine or epoxy type.

In accordance with a specific embodiment of the present invention, the mean size of the polymer particles present in the said completely or partially polymerized pre-emulsion was controlled in order not to exceed 95 nm, in particular not to exceed 85 nm and, more particularly, in order not to exceed 65 nm.

The methods for measuring and controlling the mean size of the particles in the completely or partially polymerized pre-emulsion, before the main stream of the monomer components, preferably in the emulsified form, is mixed with it (in at least one stage), are well known to a person skilled in the art, for example from E. A. Collins, 18th Annual Short Course (June 1987) of the Emulsion Polymers Institute, Lehigh University (Pennsylvania), from E. A. Collins, J. A. Davidson and C. A. Daniels, J. Paint Technology, 47, 35 (1975), and from the principles of operation of the AutoSizer Lo-C device from Malvern Instruments.

A person skilled in the art can also control the mean size of the polymer particles present in the completely or partially polymerized pre-emulsion from exceeding 85 nm, either by the duration of polymerization of said pre-emulsion partial stream (2 to 20% by weight of all of the monomer components), which should preferably not exceed approximately 45 minutes, or else by the overall degree of conversion of the monomers in said pre-emulsion partial stream, which should reach at least 50% and preferably at least 90% by weight of the monomers and up to less than 100% and more particularly up to a conversion of 98%.

The type and the proportions of the monomers employed according to the present invention will be chosen, according to the general knowledge of a person skilled in the art of emulsion polymerization, for the purpose of providing a (co)polymer having a glass transition temperature of at most 10° C. and/or a minimum film-forming temperature of at most 5° C.

In accordance with the present invention, the component (D) advantageously represents 0.1 to 2.5 parts by weight, in particular 0.2 to 0.75 parts by weight, per 100 parts by weight of the monomers (A)+(B)+(C)+(D).

The diacetone acrylamide and the diacetone methacrylamide, represented by the general formula (I) above, are preferred compounds (D) for the present invention with a level of 0.01 to 5%, more particularly of 0.1 to 2.5% and more preferably still of 0.2 to 0.75% by weight, with respect to the final overall level of the combination of the monomers (A)+(B)+(C)+(D).

Mention may be made, as (meth)acrylic esters (A) which can be used in the monomer compositions according to the invention, of methyl acrylate, ethyl acrylate, n-butyl acrylate, tert-butyl acrylate, 2-ethylhexyl acrylate or methyl methacrylate. The constituent (A) advantageously represents 50 to 99.99 parts by weight, preferably 60 to 99.99 parts by weight, per 100 parts by weight of the monomers (A)+(B)+(C)+(D).

Mention may be made, as vinylaromatic monomers (B) which can be used in the monomer compositions according to the invention, of styrene, α-methylstyrene, vinyltoluene, p-tert-butylstyrene, ortho-, meta- and para-methylstyrene, ortho-, meta- and para-ethylstyrene, o-methyl-p-isopropylstyrene, p-chloro-styrene, p-bromostyrene, o,p-dichlorostyrene, o,p-dibromostyrene, vinylnaphthalene, various vinyl- (alkylnaphthalenes) and vinyl(halonaphthalenes). The constituent (B) advantageously represents from 0 to 40 parts by weight, preferably 1 to 40 parts by weight and more preferably from 15 to 40 parts by weight, per 100 parts by weight of the monomers (A)+(B)+(C)+(D).

Mention may be made, as short-chain α,β-unsaturated mono- or polycarboxylic acids (C) which can be used in the monomer compositions according to the invention, of acrylic acid, methacrylic acid, itaconic acid, crotonic acid, maleic acid, fumaric acid or vinylbenzoic acid. The constituent (C) advantageously represents 0.1 to 5 parts by weight, preferably 0.1 to 2.5 parts by weight, per 100 parts by weight of the monomers (A)+(B)+(C)+(D).

The monomer composition of the invention can additionally comprise, (E) up to 3 parts by weight of at least one monomer other than (A), (B), (C) or (D) which can be copolymerized with the latter, per 100 parts by weight of the monomers (A)+(B)+(C)+(D).

Mention may be made, as examples of these other monomers (E), of short-chain α,β-unsaturated amides, such as acrylamide, methacrylamide, N-hydroxymethyl-acrylamide, N-hydroxymethylmethacrylamide, N-meth-oxymethylacrylamide, N-methoxymethylmethacrylamide, N-butoxymethylacrylamide, N-butoxymethylmethacrylamide, N-isopropoxymethylacrylamide, N-isoamyloxymethylmethacrylamide or N-octoxymethylacrylamide.

The reaction system used for the preparation of the dispersion of the invention can comprise, in addition to the monomers mentioned above [(A) to (E)]:

(F) up to 2, in particular up to 0.5, parts by weight of at least one chain transfer agent, per 100 parts by weight of the monomers (A)+(B)+(C)+(D), in order to regulate the number-average molecular mass of the resulting polymer.

Mention may be made, as examples of compounds which can be used as chain transfer agents in the present invention, of linear or branched alkyl mercaptans and of mercaptocarboxylic acids having from 2 to 8 carbon atoms and their esters, such as mercaptoacetic acid, 2-mercaptopropionic acid, 3-mercaptopropionic acid, 2-mercaptobenzoic acid, mercaptosuccinic acid, mercaptoisophthalic acid and their alkyl esters. Use will preferably be made of esters of a mercaptomonocarboxylic acid and/or of a mercaptodicarboxylic acid having from 2 to 6 carbon atoms, more particularly alkyl esters of a mercaptopropionic acid, more especially isooctyl or n-dodecyl esters of mercaptopropionic acid, or n-dodecyl mercaptan.

The aqueous polymer dispersion of the invention also comprises at least one surface-active agent and advantageously:

(G) 0.5 to 5 parts by weight, in particular 0.5 to 3 parts by weight, of at least one anionic surface-active agent; and
(H) 0 to 5 parts by weight, in particular 0 to 3 parts by weight, of at least one nonionic surface-active agent, these amounts being calculated on the basis of the solid or dry matter (for surfactant on a 100% dry basis) and being expressed with respect to 100 parts by weight of the monomers (A)+(B)+(C)+(D) of the overall composition used in the final latex. The levels shown are therefore overall levels with regard to the final product (dispersion) obtained after the end of the emulsion polymerization.

The component (G) (at least one anionic surfactant) is necessarily present as surfactant in all the polymerization stages: complete or partial prepolymerization and additional stages in which the emulsion polymerization is continued. Its presence is therefore necessary in all the emulsified monomer compositions involved in each of the stages mentioned.

The component (H) (at least one nonionic surfactant) may also be present, in which case it is introduced (1) either with the prepolymerization charge, (2) or at the end of the final polymerization stage, (3) or both with the prepolymerization charge and after the end of the final polymerization stage. Preferably, (H) is introduced in its entirety after the end of the final polymerization stage, in order to improve the stability of the final aqueous dispersion. This stability is further increased by the addition of (H) according to (3).

The overall levels of (H) (per 100 parts of monomers in the final latex) are in particular, for either of the options (1) and (2), from 0.2 to 5%, preferably from 0.2 to 3%; and, for the option (3), from 0.2 to 4% at each of the two moments indicated, the overall level of (H) not exceeding 5%.

In particular, when (H) is introduced with the prepolymerization monomer charge, the level of (H) with respect to the cumulative amount of surfactants (H)+(G) at this stage preferably varies from 10 to 50%.

In particular, the level of anionic surfactant present after the complete or partial prepolymerization, with respect to the total monomers (final latex), is from 0.2 to 2%. Approximately up to half the amount of total (G) is advantageously already present at the (complete or partial) prepolymerization stage.

Mention may be made, as anionic surface-active agents (G), of sulfates and sulfonates of high molecular mass, for example sodium and potassium alkyl, aryl and alkylaryl sulfates and alkyl-, aryl- and alkylarylsulfonates, such as sodium 2-ethylhexyl sulfate, potassium 2-ethylhexyl sulfate, sodium nonyl sulfate, sodium undecyl sulfate, sodium tridecyl sulfate, sodium pentadecyl sulfate, sodium lauryl sulfate, sodium methylbenzenesulfonate, potassium methylbenzenesulfonate, potassium toluenesulfonate and sodium xylenesulfonate; higher fatty alcohols, such as stearyl alcohol and lauryl alcohol, which have been ethoxylated and sulfonated; dialkyl esters of alkali metal salts of sulfosuccinic acid, such as sodium diamyl sulfosuccinate; and formaldehyde/naphthalene-sulfonic acid condensation products.

Mention may be made, as nonionic surface-active agents (H), of polyethers, such as condensates of ethylene oxide and of propylene oxide, alkyl and alkylaryl polyethylene glycol and polypropylene glycol ethers and thioethers, alkylphenoxypoly(ethylenoxy)ethanols, poly-oxyalkylenated derivatives of long-chain fatty acid partial esters, condensates of ethylene oxide with higher alkyl mercaptans or ethylene oxide derivatives of long-chain carboxylic acids and of alcohols. These nonionic surfactants preferably comprise approximately 10 to 100 ethylenoxy units per molecule and more preferably still approximately 20 to 50 such units.

The amount of water used in the reaction medium is generally determined by the level of solids desired in the finished polymer emulsion, which is generally between 40% and 70%, preferably 45 and 60%, by weight.

The monomer components of the latexes of the present invention were polymerized using effective amounts, preferably between 0.2 and 2% by weight of the total charge of monomers, of at least one conventional free radical initiator. Such an initiator is preferably substantially water-soluble. Such initiators comprise inorganic peroxides, such as hydrogen peroxide, alkali metal persulfates and perborates, and redox systems, such as combinations of an ammonium or alkali metal persulfate, perborate or perchlorate with an alkali metal bisulfite.

The polymerization temperature required to produce the aqueous polymer latexes of the present invention, both in the stage of complete or partial polymerization involving from 2 to 20% by weight of the total overall charge of monomers and in the main polymerization stage or stages involving the remainder of the monomers, generally varies from approximately 40 to 95° C., preferably from approximately 55 to 85° C., according to the duration anticipated for the polymerization. The duration of the main polymerization stage or stages, with addition to the reaction medium of 80 to 98% by weight of the remaining monomer components in at least one time, is generally approximately 60 minutes to 8 hours, preferably 90 minutes to 3 hours, this duration being longer when the polymerization temperature is lower.

In particular, the aqueous polymer dispersion according to the invention is advantageously that obtained by a process comprising the following successive stages:

(a) complete or partial emulsion prepolymerization of 2 to 20% by weight of the overall composition of the monomers (A) to (E) with, in the case of a partial prepolymerization, an overall degree of conversion of the monomers of at least 50%, preferably of at least 90%, up to less than 100% and in particular up to 98%;

(b) continuous addition of 40 to 49% by weight of the composition of the monomers (A) to (E) to said pre-emulsion obtained in (a) over 45 to 180 minutes and continuation of the emulsion polymerization for 0 to 60 minutes; and (c) continuous addition of the remaining 40 to 49% by weight of the composition of the monomers (A) to (E) to the emulsion obtained in stage (b) over 15 to 120 minutes and continuation of the emulsion polymerization for 0 to 60 minutes, all the monomer components having been introduced in an emulsified form. The monomer compositions involved in stages (a), (b) and (c) of said process may be identical for the three stages mentioned or may be different at each stage, provided that said compositions and their respective proportions, combined for each of these stages, are such that the overall composition of the monomers in the final product is within the ranges defined above for the monomer components (A) to (E).

In a specific embodiment, said process comprises a final additional stage (d) of addition of at least one nonionic surfactant (H) to the finished product with an overall level, with respect to the overall sum of the monomers, ranging from 0.2 to 5% and more preferably from 0.2 to 3%.

According to another specific embodiment which can be combined with the preceding embodiment, at the (complete or partial) prepolymerization stage, at least one nonionic surfactant (H) is combined with at least one anionic surfactant (G), the nonionic surfactant (H) preferably representing from 10 to 50% of the cumulative sum of the surfactants (G) and (H) in this stage. More particularly, the level of anionic surfactants (G) which are present in this stage represents approximately up to half of the final total amount of these surfactants (G).

Advantageously, the final dispersion (latex) according to the invention was subjected, according to another alternative form of this process, to an additional stage (c') of post-treatment using an initiator system of free radicals having a short half-life, in order to achieve a residual monomer level not exceeding 50 ppm.

With respect to the possible presence of stage (d) described above, this stage (c') is carried out before stage (d).

The emulsion according to the invention is in particular an emulsion which makes it possible to achieve washability values, measured according to the DIN 53778 standard, as high as at least 2 400 cycles for a measurement carried out after drying for 28 days on a paint film comprising 6% by weight of said polymer composition (calculated on a dry basis).

The present invention also relates to a specific process for the manufacture of the aqueous polymer emulsion as defined above, characterized in that:

(a) in a first stage, 2 to 20% by weight of the composition of the monomers (A) to (E) are introduced into a reactor and a complete or partial emulsion prepolymerization is carried out with, in the case of a partial prepolymerization, an overall degree of conversion of monomers of at least 50%, preferably of at least 90%, and up to less than 100% and in particular up to 98%;

(b) in a second stage, 40 to 49% of the composition of the monomers (A) to (E) are added continuously in the space of 45 to 180 minutes and the emulsion polymerization is continued for 0 to 60 minutes; and (c) in a third stage, the remaining 40 to 49% of the composition of the monomers (A) to (E) are added continuously in the space of 15 to 120 minutes and the emulsion polymerization is continued for 0 to 60 minutes, to completion, all the monomer components being introduced in emulsified form.

In accordance with various more specific characteristics of the process:

at each of the stages, at least one anionic surface-active agent (G) is introduced, representing a final cumulative level of 0.5 to 5% by weight with respect to the overall sum of the monomers (A) to (D) in the final product;

at least one nonionic surfactant (H) is added after the end of the main emulsion polymerization with an overall level with respect to the monomers (A) to (D) being from 0.2 to 5%;

at least one nonionic surfactant (H) can be combined with an anionic surfactant (G) at the stage of the complete or partial prepolymerization, with the nonionic surfactant representing from 10 to 50% of the cumulative surfactants (G)+(H) of the stage, the anionic surfactant (G) representing at this stage advantageously approximately up to half of the final total amount of these surfactants (G);

the complete or partial prepolymerization of the first stage is carried out while controlling the size of the polymer particles, in order to obtain a pre-emulsion having a mean size of polymer particles not exceeding 95 nm, preferably not exceeding 85 nm and more particularly not exceeding 65 nm; the degree of conversion of the monomers in the case of a partial prepolymerization is at least 50%, preferably at least 90%, and up to less than 100%, in particular up to 98%;

the first stage is carried out for 5 to 45 minutes at a temperature of 70 to 85° C.;

the remainder of the monomers is added to the second and to the third stage at a temperature of between 65 and 75° C. and the polymerization is continued at each of these stages while raising the temperature to a value of between 75 and 85° C.; and three mixtures of monomers are used in the three respective stages, which mixtures can each have the same proportions of monomers as the composition (A)+(B)+(C)+(D)+(E) defined above or at least two of the mixtures have different proportions; thus, the composition of the monomer charge during the (complete or partial) prepolymerization stage can be the same as, or else can be different from, the composition of the monomer charge added during the two main polymerization stages, provided, however, that the final overall composition of the monomers is in agreement with the general definition of the monomer composition indicated above.

For the purpose of achieving a final degree of conversion of the polymerization reaction which is as close as possible to 100%, it may be desirable to follow the third stage (c) by a stage (c') of heating the aqueous polymer dispersion for approximately 30 to 90 minutes at a temperature preferably at least 8° C. greater than the polymerization temperature (postheating).

An additional improvement of the present invention is the treatment of the aqueous polymer emulsion after the third stage (c) and, if appropriate, after the postheating stage (c') using an initiation system of free radicals having a short-half life at the temperature under consideration, for the purpose of achieving an overall degree of conversion of close to 100% and/or a residual level of monomers not exceeding 50 ppm. Mention may be made, as examples of initiator systems of free radicals, of organic and inorganic peroxides, such as tert-butyl hydroperoxide, butyl peroxide or hydrogen peroxide, or alkali metal persulfates, in combination with a reducing agent, such as sodium formaldehydesulfoxylate, ascorbic acid or Mohr's salt. Such a treatment can be carried out at temperatures of 40° C. to 90° C. approximately.

When the latex prepared in conformity with the present invention appears to be too acidic to participate in the formulation of paints, it may be desirable to adjust this pH to a value of greater than 7, for example using any alkaline material, such as sodium hydroxide, potassium hydroxide or ammonium hydroxide.

The present invention also relates to the use of an aqueous polymer emulsion as defined above or prepared by the process as defined above in protective and/or decorative coatings on substrates such as wall faces, wood, metals, plastics, composites, and the like, this being the case for internal or external use, and, more particularly, for protective and/or decorative paints for internal and/or external use for such substrates.

Another subject matter of the present invention is a paint composition, advantageously without plasticizer and without coalescent, comprising, as binder, at least one aqueous polymer emulsion of the type described above or prepared by the specific process as described above, said aqueous paint having an extraordinarily high performance and in particular a washability which is significantly improved with respect to that of the aqueous paints according to EP-B-0 690 882. In particular, the paint compositions according to the present invention advantageously include less than 10% by weight of said binder (calculated on a dry basis). As indicated above, these paints advantageously possess a washability value, measured according to the DIN 53778 standard, of at least 2 400 cycles for a measurement carried out after drying for 28 days on a paint film comprising 6% by weight of said polymer composition (calculated on a dry basis).

The formulating method used can be any one of those known to date in the art of formulating latex paints. Essentially, the aqueous paints according to the invention comprise a mixture of pigment material and of latex. The pigment material is preferably used in a form suitably reduced to a powder by conventional means, as are all the other optional solid adjuvants described below.

In order to combine the paint ingredients in order to formulate a latex paint of the present invention, one or more primary pigments and optionally other adjuvants (which themselves may be liquid or solid) can be incorporated in the latex binder to form a uniform mixture simply by adding all the starting materials to a stirred receptacle. Although it is possible to combine the pigments and others with the emulsion and to mill or crush the mixture in a dispersion mill, it is desirable first to prepare an aqueous paste of pigment and of adjuvants, preferably using a dispersing agent, in a device with a high shear gradient and then to combine the paste obtained with the latex. The consistency of the paste can be controlled by the respective amounts of water, of pigments and of adjuvants used.

The pigment materials which can be used to formulate the aqueous paints of the present invention comprise (but without being limited thereto) primary pigments of conventional type or coloring bases, such as titanium oxide, carbon black, cadmium sulfide, cadium selenide, copper phthalocyanine, zinc oxide, zinc sulfide, iron oxide or chromium oxide. The proportion of pigment material used to formulate an aqueous paint according to the present invention is determined by a number of factors, comprising the depth of color desired and the covering power. Given that the present invention is mainly applicable to mat paints, that is to say according to the DIN 53778 (part 1) standard, offering a reflection of greater than 7% but of less than 45% under an angle of 85°, the pigment volume concentration is preferably between 70% and 95% approximately.

In addition to the primary pigments, one or more adjuvants can, if desired, be included in the aqueous paint formulation of the present invention. Such ingredients comprise (but without being limited thereto):

dispersants, also known as deflocculants, that is to say compounds capable of enhancing the formation of electrical charges of the same sign at the surface of the polymer particles and, consequently, of promoting the creation of repulsive forces of electrical nature between these particles, such as alkali metal silicates (in particular metasilicates), alkali metal polyphosphates and alkali metal salts of organic polyacids (in particular polyacrylates);

wetting agents, that is to say compounds capable of modifying the surface tension of the medium, generally comprising groups of hydrophilic and hydrophobic nature. They can include anionic surface-active agents (for example, alkali metal alkylarylsulfonates), cationic surface-active agents (for example, quaternary ammonium salts) or nonionic surface-active agents (for example, poly(ether oxide)s);

rheology modifiers or thickeners, such as water-soluble polymers modified by hydrophobic groups (for example, hydrophobically modified urethane ethoxylate) and hydroxyalkyl cellulose derivatives;

inorganic bases, that is to say, for example, ammonia, sodium hydroxide or potassium hydroxide;

antifoaming agents, such as a mixture of mineral oil and of nonionic emulsifier;

biocides, that is to say compounds capable of destroying microorganisms, such as chloroallyl or isothiazolone derivatives;

corrosion inhibitors, such as an aqueous solution of sodium benzoate and/or of sodium nitrite;

insecticides, pesticides, fungicides and acaricides, such as pyrethroid compounds (for example, decamethrin or diledrin), lindane, N-heterocyclic compounds, uracyl compounds, triazole derivatives or organophosphorus compounds.

The choice of the specific adjuvants and their respective amounts are generally dictated by the properties desired for a specific aqueous paint and are within the scope of a person skilled in the art. Generally, however, the latex paints of the present invention have an overall level of solid matter of between approximately 40 and 70% by weight.

The aqueous paints of the present invention can be applied to the surface of a wall or to any other substrate by any other conventional means, for example brush, roller or spray gun. The paint can be crosslinked or dried after application to the substrate, also by conventional means, for example air drying or stoving. The crosslinked or non-crosslinked paint coating has an excellent performance as regards resistance to yellowing, washability and coalescence at low temperature. In addition, the surfaces coated using the latex paints according to the present invention behave well as regards the contrast ratio (that is to say, the covering power).

The following examples illustrate the present invention without, however, limiting the scope thereof. In these examples, the parts and percentages are by weight, unless otherwise indicated. The following abbreviations were used to denote the monomers used:

BuA: butyl acrylate
AA: acrylic acid
St: styrene
AM: acrylamide
DAAM: diacetone acrylamide.

The surface-active agents used were as follows:
Polyoxyethylenated sodium nonylphenol ether sulfate comprising 25 mol of ethylene oxide (anionic surfactant), sold by Witco under the trade name Rewopol® NOS 25 (35% active);
Disodium fatty alcohol ether sulfosuccinate (anionic surfactant), sold by Cytec under the trade name Rewopol® SBFA 50 (30% active);
Polyoxyethylenated nonylphenol comprising 25 mol of ethylene oxide (nonionic surfactant), sold by Cognis under the trade name Disponil® NP 2528 (28% active);
Polyethoxylated linear $C_{12}$–$C_{1-4}$ alcohols comprising 30 mol of ethylene oxide (nonionic surfactant), sold by Cognis under the trade name Disponil® A-3065 (65% active).

In the following examples, the surface-active agents have been denoted by the above trademarks under which they are sold.

EXAMPLES 1 AND 2 (OF THE INVENTION)

Preparation of the Aqueous Polymer Emulsions

General Procedure:

Preparation of a Pre-Emulsion PE of the Monomers:

A feed pre-emulsion PE composed of demineralized water, at least one surfactant, the monomers and n-dodecyl mercaptan (chain transfer agent) is first prepared. The composition and the proportions of the constituents of this pre-emulsion are shown in table 1. For this, the ingredients of the pre-emulsion PE are added at ambient temperature (23° C.) in the order shown in table 1 to a receptacle equipped with a stirrer.

First Stage: Partial Prepolymerization

A charge $A_f$, composed of water and a surface-active agent as shown in table 1 in the proportions also shown in table 1, is introduced into a reactor equipped with a stirring device.

The temperature is brought to 76° C. with stirring at 100 rpm and the medium is maintained at this temperature for 10 minutes with stirring.

A charge $B_f$ (initial seed), composed of 3.5% of the feed pre-emulsion PE, is subsequently introduced into the reactor in the space of 10 minutes. The reactor is then heated to 76° C. and is then maintained at this temperature. An aqueous ammonium persulfate solution $C_f$ (initiator) is then added to the reactor, followed by an aqueous ammonium metabisulfite solution $D_f$ (activator), the composition and the proportions of which solutions are shown in table 1. Water ($E_f$) is subsequently added to rinse the pipes. The polymerization is then continued for approximately 20 minutes and the temperature begins to decrease and reaches 80° C.

Second Stage: First Main Polymerization Stage

Additions:

When the temperature reaches 80° C., cooling to 71° C. is begun by decreasing the temperature by 0.9° C./minute, after which the temperature of 71° C. is maintained, and, simultaneously, the continuous introduction into the reactor, at a uniform rate, is begun:

of a charge $F_f$ composed of 48.25% of the pre-emulsion PE, over 90 minutes; and, at the same time, of an aqueous ammonium persulfate solution $G_f$ (initiator) as shown in table 1, also over 90 minutes, one hour after the beginning of the introduction of the charge $F_f$ and of the solution $G_f$, stirring is increased to 150 rpm (revolutions per minute) at the rate of 50 rpm/hour.

Heating:

At the end of the additions, the temperature of the reactor is maintained at 71° C. for 45 minutes, still with stirring.

Third Stage: Second Main Polymerization Stage

Additions:

When the heating of the preceding stage is finished, the simultaneous continuous introduction into the reactor, at a uniform rate, still with stirring and with the temperature maintained at 71° C., is begun:

of a charge $H_f$ composed of the remaining 48.25% of the pre-emulsion PE, over 60 minutes; and at the same time, also over 60 minutes, of an aqueous ammonium persulfate solution $I_f$ (initiator) as shown in table 1.

Heating:

Water ($J_f$) is subsequently added to rinse the pipe via which the charges $F_f$ and $H_f$ were introduced and that via which the solutions $G_f$ and $I_f$ were introduced. The reactor is subsequently brought from 71° C. to 80° C., at the rate of an increase of 0.45° C. per minute, and then heating is carried out while maintaining the reactor at 80° C. for 45 minutes.

Post-Treatment:

When heating is finished, the following are simultaneously introduced at a uniform rate:

an activator solution $K_f$ (Bruggolith® FF6) as shown in table 1, in the space of 60 minutes, and also in the space of 60 minutes, an initiator emulsion $L_f$, 70% tert-butyl hydroperoxide (TBHP), also as shown in table 1.

The pipes are then rinsed with water ($M_f$) and the temperature is maintained at 80° C. for 30 minutes (postheating).

The reactor is subsequently cooled to 30° C., at the rate of −1° C./minute, over 50 minutes.

When the temperature of 30° C. is reached, an aqueous sodium hydroxide solution $N_f$ as shown in table 1 is added at a uniform rate over 60 minutes to reach a pH of 8.3±0.2. When this neutralization phase is complete, a solution $O_f$, comprising a biocide (Mergal® K 15) and a stabilizing agent based on nonionic surfactant Disponil® A 3065 as shown in table 1, is added.

TABLE 1

Compositions of the various streams

| EXAMPLE | 1 (invention) | 2 (invention) |
|---|---|---|
| Pre-emulsion PE* | | |
| Demineralized water | | |
| Surfactants | | |
| Rewopol SBFA 50 | 2.40 | 3.10 |
| Disponil A-3065 | 1.00 | — |
| Monomers | | |
| AA | 2.50 | 2.50 |
| BuA | 61.40 | 61.40 |
| St | 35.60 | 35.60 |
| AM | | |
| DAAM | 0.50 | 0.50 |
| Chain transfer agent | | |
| n-dodecyl mercaptan | 0.05 | 0.05 |
| Charge $A_f$ | | |
| Demineralized water | 11359 | 11359 |
| Rewopol ® SBFA 50 | 388 (0.40) | 388 (0.40) |
| Charge $B_f$ | | |
| 3.5% of the pre-emulsion PE | 1406 | 1406 |
| Initiator solution $C_f$ | | |
| Demineralized water | 84 | 84 |
| Ammonium persulfate | 35 | 35 |
| Activator solution $D_f$ | | |
| Demineralized water | 84 | 84 |
| Ammonium metabisulfite | 6 | 6 |
| Water $E_f$ | 58 | 58 |
| Charge $F_f$ | | |
| 48.25% of the pre-emulsion PE | 19405 | 19405 |
| Initiator solution $G_f$ | | |
| Demineralized water | 1347 | 1347 |
| Ammonium persulfate | 43 | 43 |
| Charge $H_f$ | | |
| Remaining 48.25% of the pre-emulsion PE | 19405 | 19405 |
| Initiator solution $I_f$ | | |
| Demineralized water | 1347 | 1347 |
| Ammonium persulfate | 43 | 43 |
| Water $J_f$ | 346 | 346 |
| Activator solution $K_f$ | | |
| Demineralized water | 792 | 792 |
| Bruggolith ® FF6 | 87 | 87 |
| Emulsion $L_f$ | | |
| Demineralized water | 663 | 663 |
| Rewopol ® SFBA 50 | 100 | 100 |
| 70% TBHP | 124 | 124 |
| Water $M_f$ | 174 | 174 |

TABLE 1-continued

Compositions of the various streams

| EXAMPLE | 1 (invention) | 2 (invention) |
|---|---|---|
| Neutralization solution $N_f$ | | |
| Demineralized water | 1513 | 1513 |
| 45% Sodium hydroxide | 561 | 561 |
| Solution $O_f$ of biocide and of stabilizing agent | | |
| Demineralized water | 116 | 116 |
| Disponil ® A 3065 | 432 (1.00) | 432 (1.00) |
| Mergal K 15 | 84 | 84 |

*The values shown in the pre-emulsion part PE and those shown in brackets in the remainder of the table are expressed on a dry basis with respect to the total monomers. The other values shown are in g.

EXAMPLE 3 (EP-B-0 690 882)

A latex according to European patent EP-B-0 690 882 was prepared by using the pre-emulsion of example 2, except that the 3.10% (*) of Rewopol® SBFA 50 were replaced by 0.95% (*) of Rewopol® NOS 25 and 6.40% (*) of Disponil® NP 2528;

by using a charge $A_f$ in which the 0.40% (*) of Rewopol® SBFA 50 was replaced by 0.3% (*) of Rewopol® NOS 25;

(*) The values shown are expressed on a dry basis with respect to the total monomers.

by using an initial seeding charge $B_f$ of 10% instead of 3.50% of the pre-emulsion PE;

by carrying out only a single polymerization stage by continuous addition, at a uniform rate, of the remaining 90% in the space of 4.5 hours; and by not introducing Disponil® A 3065 in the solution $O_f$.

The characteristics of the latex obtained are listed in table 2.

TABLE 2

| EXAMPLE | 1 (invention) | 2 (invention) | 3 (EP-B-690 882) |
|---|---|---|---|
| Solids content (%) | 51.2 | 51.2 | 50.87 |
| pH | 8.2 | 8.94 | 8.35 |
| Size of the seed particles (nm)* | 40 | | |
| Final mean size of the particles of the latex (nm)* | 104.3 | 88.8 | 140.1 |
| Polydispersity | 0.200 | 0.259 | |
| Brookfield viscosity at 22° C. (mPa · s) | 420 | 1120 | 2820 |
| LVT 2-3/30 rpm at 22° C. (poises) | 4.20 | 11.20 | 28.20 |
| Level of residual monomers (ppm) | <50 | <50 | <200 |
| Minimum film-forming temperature (° C.) | <0 | <0 | <0 |

*Measured with the Auto Sizer Lo-C device from Malvern Instruments

EXAMPLE 4

Performances of Films Formed from the Aqueous Polymer Emulsions Obtained

Films of each of the aqueous polymer emulsions obtained were formed by applying a layer of emulsion of 100 μm to a sheet of glass and by drying for 2 hours at ambient temperature and for 16 hours at 50° C.

The performances of the films are listed in table 3.

TABLE 3

| Film formed from the emulsion of example | 1 (invention) | 2 (invention) | 3 (EP-B-690 882) |
|---|---|---|---|
| Appearance Evaluation of the film after immersion for 1 hour/3 hours in water | Glossy | Glossy | Glossy |
| water absorption* | 0/2 | 0/1–2 | 10 |
| swelling** | 2/4 | 2/4 | 10 |
| Loss of adhesion to the glass*** | 3/5 | 3/7 | 10 |

*Water absorption: the criteria for assessing the water absorption are as follows:
0: completely transparent film
↓
bluish film
↓
10: completely white film.
**Swelling: the criteria for assessing the swelling are as follows:
0: no swelling of the film
↓
10: completely swollen film.
***Loss of adhesion to the glass: the criteria for assessing the loss of adhesion to the glass are as follows:
0: no loss of adhesion of the film
↓
10: film completely separated from the glass.

EXAMPLE 6

Preparation and Evaluation of Paint Compositions

The aqueous polymer dispersions of examples 1 to 4 were formulated in paint compositions comprising:

| | |
|---|---|
| Water | 287.20 parts |
| Wetting agent, sold by Benkizer under the trade name Lopon ® 890 | 3.00 |
| Wetting and dispersing agent, sold by Munzing under the trade name Agitan ® 281 | 2.00 |
| Biocide, sold by Riedel de Haen under the trade name Mergal ® K 15 | 2.00 |
| Thickening agent (rheology modifier), sold by Hoechst under the trade name Tylose ® MH 6000 YG 8 | 4.80 |
| Titanium oxide, sold by Sachtleben under the trade name Hombitan R 611 | 50.00 |
| Calcium carbonate, sold by Deutsche Solvay under the trade name Socal PZ | 160.00 |
| Chalk | 250.00 |
| Calcium carbonate, sold by Omya under the trade name Omya Carb ® 10 GU | 110.00 |
| Silica, sold by Langer under the trade name Dicalite WB5 | 10.00 |
| 25% Aqueous sodium hydroxide solution | 1.00 |
| Aqueous polymer solution | 120.00 |
| | 1000.00 |

The washability or wet scrub resistance (WSR) of these paints was measured after 7 and 28 days in accordance with the DIN 53778 standard. The values of washability, expressed in cycles, according to the nature of the aqueous polymer emulsion used are shown in the following table 4.

TABLE 4

| Washability of the paint comprising the aqueous polymerized emulsion of example | 1 (invention) | 2 (invention) | 3 (EP-B-690 882) |
|---|---|---|---|
| at 28 days according to DIN 53778 | 2600 ± 200 | 2750 ± 250 | 1100 ± 100 |

What is claimed is:

1. An aqueous polymer dispersion prepared from a monomer composition comprising:
   (A) 50 to 99.99 parts by weight of at least one acrylic or methacrylic ester derived from acrylic or methacrylic acid and from an alcohol having 1 to 12 carbon atoms;
   (B) 0 to 40 parts by weight of at least one vinylaromatic monomer;
   (C) 0 to 5 parts by weight of at least one of acrylic acid, methacrylic acid, itaconic acid, crotonic acid, maleic acid, fumaric acid or vinylbenzoic acid; and
   (D) 0.01 to 5 parts by weight of at least one α, β-ethylenically unsaturated monomer compound (D) comprising at least one carbonyl group having at least one hydrogen atom carried by a carbon atom in the α position with respect to said carbonyl, the compound or compounds (D) being diacetone acrylamide, diacetone methacrylamide, 2-butanone (meth)acrylate, vinyl acetoacetate or acetoacetoxy-ethyl(meth)acrylate, per 100 parts by weight of the monomers (A)+(B)+(C)+(D);
   (G) 0.5 to 5 parts by weight of at least one anionic surface-active agent; and
   (H) 0.2 to 5 parts by weight of at least one non-ionic surface-active agent, the amounts (G) and (H) being calculated on the basis of the solid or dry matter and being expressed with respect to 100 parts by weight of the monomers (A)+(B)+(C)+(D), in the overall composition used in the final latex, and 80 to 98% by weight of the monomer components having been added to a reaction medium already comprising a completely or partially polymerized pre-emulsion representing from 2 to 20% by weight of the final overall level of the monomer components in the dispersion finally obtained, characterized in that, at the complete or partial polymerization stage, at least one nonionic surfactant (H) is combined with at least one anionic surfactant (G).

2. The aqueous polymer dispersion as claimed in claim 1, characterized in that it does not comprise any functional group or component capable of reacting with the units resulting from said compound or compounds (D) in a self-crosslinking reaction.

3. The aqueous polymer dispersion as claimed in claim 1, characterized in that the compound or compounds (D) are diacetone acrylamide or diacetone methacrylamide.

4. The aqueous polymer dispersion as claimed in claim 1, characterized in that the component (D) represents 0.1 to 2.5 parts by weight per 100 parts by weight of the monomers (A)+(B)+(C)+(D).

5. The aqueous polymer dispersion as claimed in claim 4, characterized in that the component (D) represents 0.2 to 0.75 part by weight per 100 parts by weight of the monomers (A)+(B)+(C)+(D).

6. The aqueous polymer dispersion as claimed in claim 1, characterized in that the constituent (A) represents 60 to 99.9 parts by weight of (A)+(B)+(C)+(D).

7. The aqueous polymer dispersion as claimed in claim 1, characterized in that the constituent (B) represents 1 to 40 parts by weight per 100 parts by weight of the monomers (A)+(B)+(C)+(D).

8. The aqueous polymer dispersion as claimed in claim 1, characterized in that the constituent (C) represents 0.1 to 5 parts by weight per 100 parts by weight of the monomers (A)+(B)+(C)+(D).

9. The aqueous polymer dispersion according to claim 1, characterized in that the monomer composition additionally comprises:
(E) up to 3 parts by weight of at least one monomer other than (A), (B), (C) or (D) which can be copolymerized with the latter, per 100 parts by weight of the monomers (A)+(B)+(C)+(D).

10. The aqueous polymer dispersion as claimed in claim 1, characterized in that the reaction system which was used for its preparation additionally comprises:
(F) up to 2 parts by weight of at least one chain transfer agent per 100 parts by weight of the monomers (A)+(B)+(C)+(D).

11. The aqueous polymer dispersion as claimed in claim 1, characterized in that the mean size of the polymer particles which are present in said completely or partially polymerized pre-emulsion was controlled in order not to exceed 95 nm.

12. The aqueous polymer dispersion as claimed in claim 1, characterized in that it was obtained by a process comprising the following successive stages:
(a) complete or partial emulsion prepolymerization of 2 to 20% by weight of the overall composition of the monomers (A) to (E);
(b) continuous addition of 40 to 49% by weight of the composition of the monomers (A) to (E) to said completely or partially prepolymerized pre-emulsion over 45 to 180 minutes and continuation of the emulsion polymerization for 0 to 60 minutes; and
(c) continuous addition of the remaining 40 to 49% by weight of the composition of the monomers (A) to (E) to the emulsion obtained in stage (b) over 15 to 120 minutes and continuation of the emulsion polymerization for 0 to 60 minutes, all the monomer components having been introduced in an emulsified form.

13. The aqueous polymer dispersion as claimed in claim 1, characterized in that it has been subjected to a final additional stage (d) of addition of at least one nonionic surfactant to the finished product with an overall level, with respect to the overall sum of the monomers, ranging from 0.2 to 5%.

14. The aqueous polymer dispersion as claimed in claim 1, characterized in that it has been subjected to a post-treatment (c') using an initiator system of free radicals having such half-life, in order to achieve a residual monomer level not exceeding 50 ppm.

15. The aqueous polymer dispersion as claimed in claim 1, characterized in that it makes it possible to achieve wash ability values, measured according to the DIN 53778 standard, as high as at least 2 400 cycles for a measurement carried out after drying for 28 days on a paint film comprising 6% by weight of said polymer composition (calculated on a dry basis).

16. A process for the manufacture of an aqueous polymer dispersion as defined in claim 1, characterized in that:
(a) in a first stage, 2 to 20% by weight of the composition of the monomers (A) to (E) are introduced into a reactor and a complete or partial emulsion prepolymerization is carried out with, in the case of a partial prepolymerization, an overall degree of conversion of monomers of at least 50% and up to less than 100%;
(b) in a second stage, 40 to 49% of the composition of the monomers (A) to (E) are added continuously in the space of 45 to 180 minutes and the emulsion polymerization is continued for 0 to 60 minutes; and
(c) in a third stage, the remaining 40 to 49% of the composition of the monomers (A) to (E) are added continuously in the space of 15 to 120 minutes and the emulsion polymerization is continued for 0 to 60 minutes, to completion, all the monomer components being introduced in an emulsified form.

17. The process as claimed in claim 16, characterized in that, at each of the stages, at least one anionic surface-active agent (G) representing a final cumulative level of 0.5 to 5% by weight with respect to the overall sum of the monomers (A) to (D) in the final product is introduced with the monomer charge.

18. The process as claimed in claim 16, characterized in that at least one nonionic surfactant (H) is added after the end of the main emulsion polymerization with an overall level with respect to the monomers (A) to (D) being from 0.2 to 5%.

19. The process as claimed in claim 16, characterized in that at least one nonionic surfactant (H) is combined with an anionic surfactant (G) at the stage of the complete or partial prepolymerization, with the nonionic surfactant (H) representing from 10 to 50% of the cumulative surfactants of the stage, the anionic surfactant (G) representing, at this stage, advantageously approximately up to half of the final total amount of this anionic surfactant (G).

20. The process as claims in claim 16, characterized in that the complete or partial prepolymerization of the first stage is carried out while controlling the size of the polymer particles, in order to obtain pre-emulsion having a mean size of polymer particles not exceeding 95 nm.

21. The process as claimed in claim 16, characterized in that the first stage is carried out for 5 to 45 minutes at a temperature of between 70 and 85° C.

22. The process as claimed in claim 16, characterized in that the remainder of the monomers is added to the second and to the third stage at a temperature of between 65 and 75° C. and that the polymerization is continued at each of these stages while raising the temperature to a value of between 75 and 85° C.

23. The process as claimed in claim 16, characterized in that three mixtures of monomers are used in the three respective stages, which mixtures each have the same proportions of monomers as the composition (A)+(B)+(C)+(D)+(E) or at least two of the mixtures have different proportions.

24. The process as claimed in claim 16, characterized in that the third stage (C) is followed by a stage (c') of heating the aqueous polymer dispersion for approximately 30 to 90 minutes at a temperature preferably at least 8° C. greater than the polymerization temperature.

25. A method for protecting and/or decorating coatings on substrates such as wall faces, wood, metals, plastics or composites, this being the case for internal or external use, and, more particularly, for protective and/or decorative paints for internal and/or external use for such substrates, the method comprising the step of applying an aqueous polymer dispersion as defined in claim 1 or prepared by the process as defined in claim 16 to the such substrates.

26. A paint composition comprising, as binder, at least one aqueous polymer dispersion as defined in claim 1 or prepared by the process as defined in claim 16.

27. The paint composition as claimed in claim 26, characterized in that it comprises neither plasticizer nor coalescent.

28. The paint composition as claimed in claim 26, characterized in that it includes less than 10% by weight of said binder (calculated on a dry basis).

29. The paint composition as claimed in claim 26, characterized in that it has a washability value, measured according to the DIN 53778 standard, of at least 2 400 cycles for a measurement carried out after drying for 28 days on a paint film comprising 6% by weight of the said polymer composition (calculated on a dry basis).

* * * * *